INVENTOR:
ROGER SCHWING
BY Robert Henderson
ATTORNEY

United States Patent Office 3,019,026
Patented Jan. 30, 1962

3,019,026
COOLED SEALING ASSEMBLY
Roger Schwing, Palmyra, N.Y., assignor to Garlock Inc., a corporation of New York
Filed Nov. 2, 1959, Ser. No. 850,170
2 Claims. (Cl. 277—16)

This invention relates to sealing devices for use in machinery, for sealing shafts, rods or the like against leakage of fluid therealong. More particularly, it relates to and has for its principal object the provision of improved cooling means, interposed between a sealing assembly and heat-conducting members of a machine in which the seal is employed, for shielding and protecting the sealing assembly from high temperatures generated in adjacent machine portions and conducted by such members toward the sealing assembly.

The stated object is achieved by this invention of which a preferred embodiment is shown, for illustrative purposes, in the accompanying drawings in which.

Figure 1:
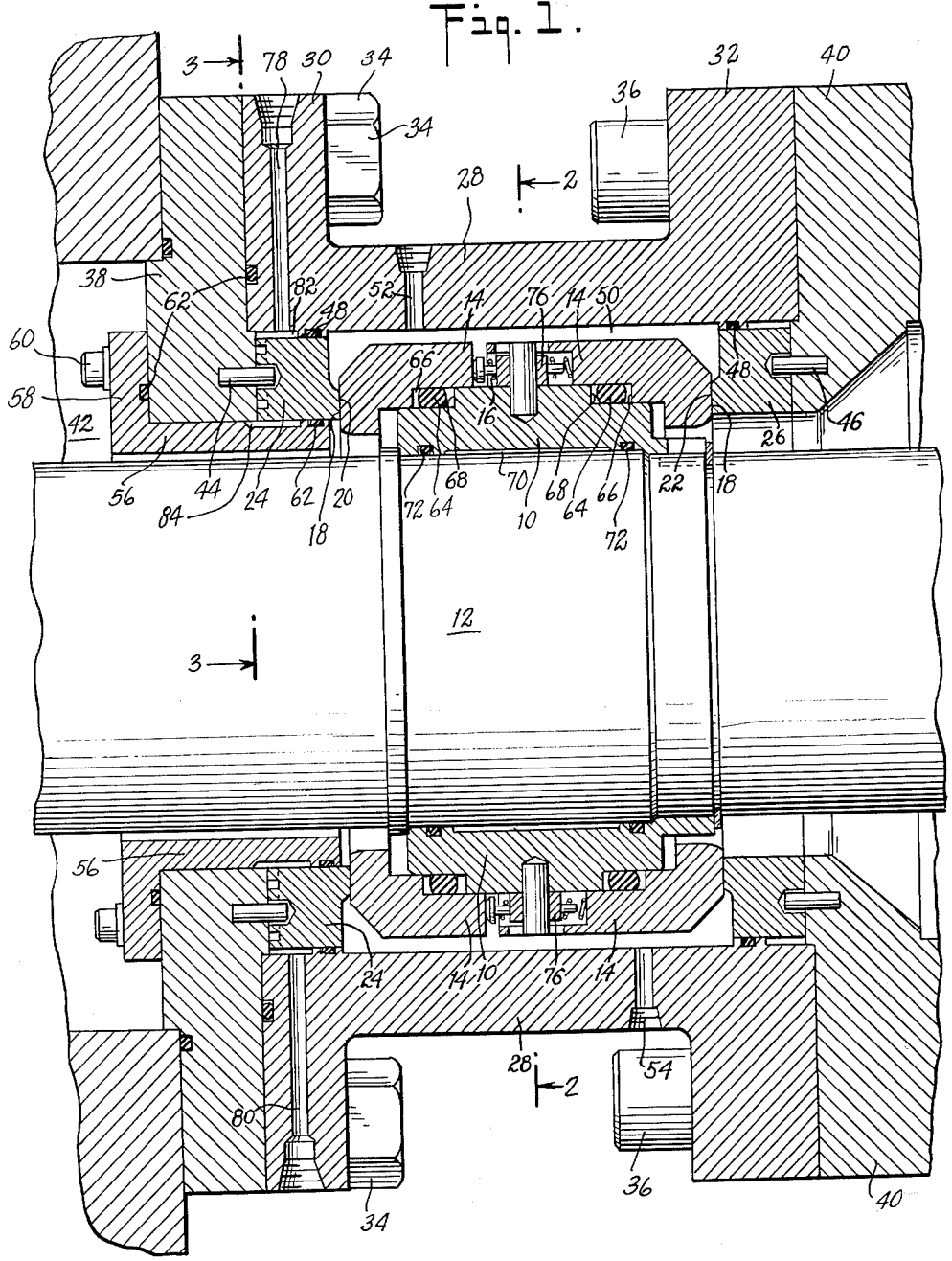
FIGURE 1 is a central axial sectional view of the mentioned embodiment shown in association with portions of a shaft and a related machine casing.

A sealing assembly embodying this invention is particularly useful in sealing a shaft or the like against leakage of fluid therealong in apparatus in which the shaft and machine-casing parts adjacent to the sealing assembly (sometimes hereinafter referred to merely as a "seal") may have high temperatures which, if transferred, unabated, to the seal, would cause deterioration of parts of the latter and resultant unsatisfactory performance thereof.

The seal illustrated in the drawings, excepting cooling arrangements hereinafter detailed, is substantially the same as the seal disclosed and fully described in my application for United States patent, filed September 17, 1959, under Serial No. 840,612. Therefore, the seal is hereinafter described in such detail as to afford a complete understanding of this invention without, however, laboring the present description. If details are desired beyond those directly bearing upon this invention, they may be ascertained by reference to the mentioned earlier patent application.

The illustrated seal comprises a sleeve 10 which is fixed upon and constrained to turn with shaft 12, a pair of substantially similar but oppositely facing, rigid, rotary sealing rings 14 which are urged yieldably apart by a circumferential series of compressed coil springs 16 to hold annular end faces 18 of said sealing rings in sliding sealing engagement with sealing faces 20 and 22 of non-rotary, rigid sealing rings 24 and 26.

The seal is disposed within a collar 28 formed with integral end connection flanges 30 and 32 which, by means of bolts 34 and 36, are connected to casing walls 38 and 40, which are suitably apertured to receive the shaft therethrough. In one manner of usage, the casing wall 38 may constitute an end wall defining a mixing chamber an area of which is shown at 42; and a mixing element (not shown), or other instrumentality for treating matter within the chamber 42, may be suitably fixed upon that end of the shaft which protrudes into said chamber. The casing wall 40 may constitute a cover plate for covering the described sealing assembly; the shaft extending outwardly through that plate and having suitable actuating means, such as a motor, connected to the shaft for rotating the latter.

Circumferential series of pins 44, 46, seated within suitable recesses in casing walls 38 and 40 and in the non-rotary sealing rings 24 and 26, serve to hold the latter rings against rotation. The rings 24 and 26 are sealed relatively to the collar 28 by rubber O rings 48 disposed within suitable recesses in said collar. These O rings serve to seal a chamber 50, within which the rotary parts of the seal operate.

At one circumferential point, the collar 28 is formed with an inlet port 52 toward one end thereof, enabling seal-operating fluid such as oil, water or glycerin (which may function also as cooling fluid), to be introduced into the chamber 50 from a suitable source (not shown); and preferably at a 180° removed point in the collar 28 toward the other end of the latter is formed an outlet port 54 through which such seal operating and cooling fluid may be exhausted from the chamber 50.

It will be seen that the fluid in the chamber 50 functions for seal-operating purposes in that, when under pressure, it may act upon inner end surfaces of the two rotary sealing rings 14 to augment the springs 16 in urging said rotary sealing rings forcibly against the non-rotary sealing rings 24 and 26; also, that said fluid may function as an operating medium in at least partially lubricating the contacting and relatively sliding faces 18, 20 and 22 of the rotary and non-rotary sealing rings.

It may be noted also that the fluid circulated in chamber 50 comes into contact with substantial surfaces of both the rotary sealing rings 14 and the non-rotary sealing rings 24, 26 to carry off heat developed in said rings in the use of the seal. Cooling means as thus far described are believed to have been utilized previously in certain sealing arrangements, and such hereinbefore-described cooling means are not asserted to constitute this invention, except in combination with other cooling means hereinafter described.

A collar 56 extends axially within casing wall 38 and is formed with an integral flange 58, by which, with a circumferential series of bolts 60, the collar 56 is rigidly fixed to said casing wall. Rubber O rings 62, seated in suitable annular grooves, are provided for effecting seals between the collar 28 and casing wall 38 and between the latter wall and flange 58 of the collar 56, as well as between the latter collar and the inner periphery of non-rotating sealing ring 24. Somewhat larger rubber O rings 64 are disposed within annular recesses formed between opposed annular rabbets 66 and 68 formed, respectively, within rotary sealing rings 14 and upon rotary sleeve 10 to effect a seal between said rotary sealing rings and said sleeve which permits some relative axial movement therebetween.

Any substantial degree of heat to which the seal might be subjected, apart from any frictional heat developed in the seal itself, would emanate from the chamber 42, or, more particularly, from material being mixed or otherwise treated in said chamber, and conduction of such heat toward the seal would normally be through casing wall 38, collars 28 and 56, and shaft 12. The principle upon which this invention operates to protect the seal from such heat is that circulating walls or bodies of cooling liquid be interposed between said wall 38, collars 28 and 56, and shaft 12, and seal portions immediately adjacent to the just-mentioned machine parts.

Figure 2:
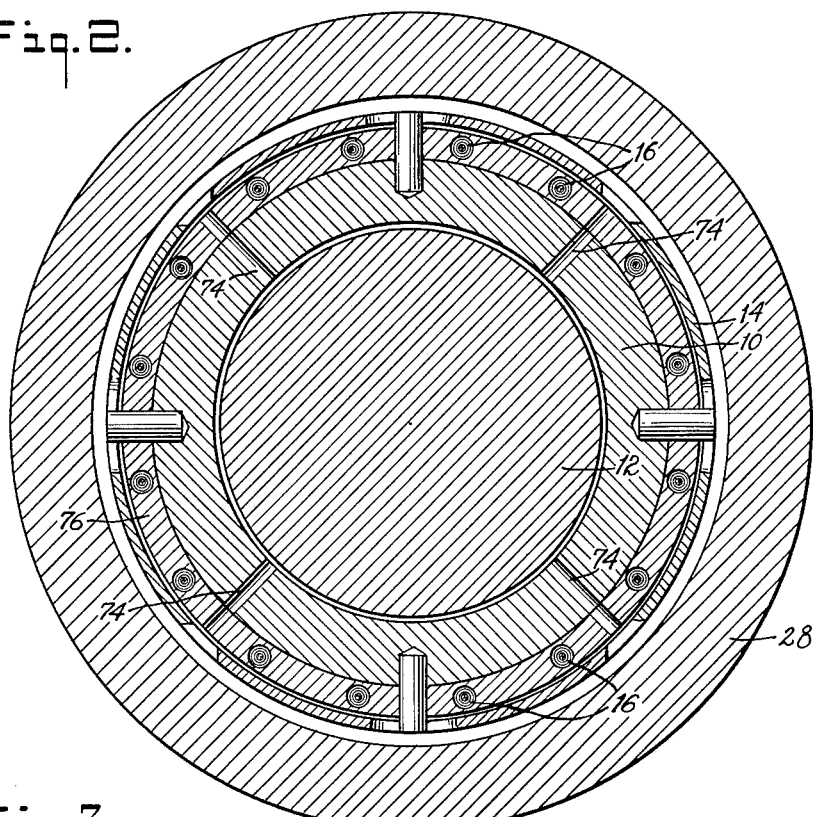
FIG. 2 is a transverse sectional view substantially on the line 2—2 of FIG. 1.

To provide such a wall of cooling liquid with respect to the shaft, the sleeve 10 is formed with an inner annular recess 70 which extends axially throughout a substantial intermediate portion of said sleeve, but terminates at its opposite ends somewhat short of the ends of said sleeve. At opposite ends of said sleeve and spaced outwardly from the opposite axial limits of the recess 70, the sleeve 10 is formed with annular grooves within which are disposed rubber O rings 72 which provide a static seal between the sleeve 10 and the shaft 12 to prevent leakage of sealed fluid along the shaft and within said sleeve. The recess 70 is connected with chamber 50 by radial passages 74 (FIG. 2) which extend through the sleeve 10 and a spring-holding ring 76 in which the springs 16 are retained. Although it may seem that the passages 74 would not cause flow of seal operating and cooling fluid between the chamber 50 and the recess 70, tests show that such flow does indeed occur, so that the fluid from chamber 50 constitutes in the recess 70 a continuously circulating barrier which substantially opposes transfer of heat from shaft 12 to the seal.

To provide for circulation of a wall of cooling fluid between the seal on the one hand and casing wall 38 and collars 28 and 56 on the other hand, the collar 28 has an inlet port 78 formed therein enabling a suitable cooling fluid to be introduced into a fluid space in the immediate vicinity of non-rotary sealing ring 24 and an outlet port 80 preferably removed about 180° from said inlet port, enabling such cooling fluid to be carried off from the vicinity of the sealing ring 24. To permit free circulation of said cooling fluid about the outermost portions of the sealing ring 24, an annular space 82 is provided about the outer periphery of ring 24 and an annular space 84 is provided about the inner periphery of said ring; the spaces 82 and 84 being interconnected by a suitable channel or groove system upon either or both interengaging faces of the casing wall 38 and the ring 24.

Figure 3:
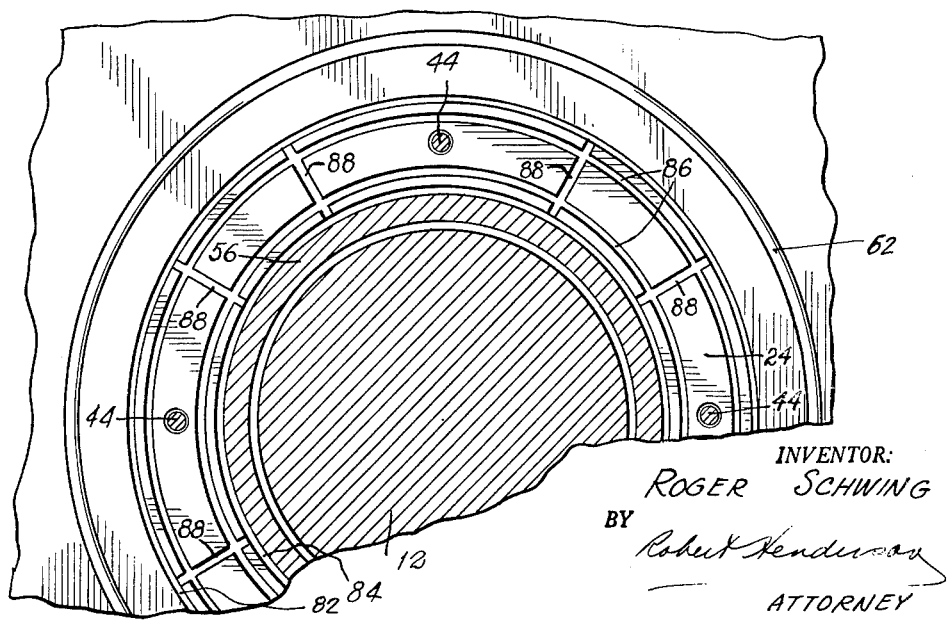
FIG. 3 is a transverse sectional view substantially on the line 3—3 of FIG. 1; the part broken away from the bottom of this figure being the same as the portion shown toward the top of the figure.

As illustrated herein, the mentioned channel system is formed in the outer or back face of ring 24 and comprises (FIG. 3) two continuous, circular channels 86 and a plurality of channels 88 which intersect and run into channels 86 and extend radially completely across the back end of the ring 24. The channel system may be of various forms, the preference of this feature of the invention merely being that cooling fluid passing from port 78 into space 82 is free to pass across the back face of the ring 24 into space 84. Fluid from the spaces 82 and 84 and from the channel system is free to be exhausted through exhaust port 80.

The seal disclosed herein may be employed advantageously under various conditions. For example, the fluid pressure in mixing chamber 42 may be upwards of 650 p.s.i. while the pressure of liquid circulating in chamber 50 and recess 70 may be greater than the pressure in chamber 42 and upwards of 700 p.s.i. The temperature in chamber 42 may be upwards of 375° F., but, because of the walls of circulating cooling fluid provided at the back end of non-rotary sealing ring 24 and between sleeve 10 and shaft 12, the heat in chamber 42 is substantially prevented from finding its way to the seal whereby the latter is safeguarded from deterioration from excessive heat.

The parts of this seal, of course, should be of suitable materials. Thus, although various O rings have been referred to as being of "rubber," they may be of "Teflon" or "Kel-F" or other material which may be more suitable than rubber for operation under certain temperature or pressure conditions. Likewise, the rigid and other parts of the seal should be of metal or other material suited to the use to which the seal is to be subjected.

It should be obvious that the present inventive concept may be useful in various seal structures other than that disclosed herein without, however, departing from the invention as set forth in the following claims.

I claim:

1. A fluid-cooled sealing assembly for effecting a seal between a machine casing and a rotary shaft extending through an opening in said casing, said assembly comprising a rotary sealing ring sealed to and constrained to turn with said shaft, and a stationary sealing ring, carried in said casing, having a sealing surface at one end of said stationary ring in sliding sealing engagement with a sealing surface of said rotary ring, said casing and said stationary ring being formed to provide interconnected fluid passages at the stationary ring's other end and about substantial portions of the stationary ring's inner and outer peripheries, said casing being formed with separate cooling-fluid inlet and outlet ducts leading to and from said passages, and said passages and ducts being defined solely by said casing and said stationary ring, and completely sealed against fluid communication with said shaft and said rotary ring.

2. A fluid-cooled sealing assembly for effecting a seal between a machine casing and a rotary shaft extending through an opening in said casing, said assembly comprising an annular portion of said casing, surrounding said shaft and formed with an axially facing annular recess having a radially extending bottom wall surface and spaced axially extending side wall surfaces all of which surfaces are of said annular casing portion, a rigid, stationary sealing ring, in said recess, having a back wall surface abutting said bottom wall surface, inner and outer peripheral surfaces in spaced facing relationship to said side wall surfaces and forming inner and outer fluid passages between said stationary ring and said machine casing, and a front wall having a sealing surface in sliding sealing engagement with an opposed sealing surface associated with and turning with said shaft, and annular packing means between and in sealing engagement with said inner and outer peripheral surfaces and said side wall surfaces of said recess, substantially distal from said back wall surface and adjacent to said front wall, sealing said inner and outer fluid passages from fluid communication with said front walls; said assembly being formed with a passage at said bottom wall surface of said recess, affording fluid communication between said inner and outer fluid passages, said machine casing being formed with separate cooling-fluid inlet and outlet ports leading to and from all said passages, and all said passages and ports being defined solely by said casing and said stationary ring, and completely sealed against fluid communication with said shaft and with the latter's said opposed sealing surface.

References Cited in the file of this patent

UNITED STATES PATENTS

| | | |
|---|---|---|
| 2,470,419 | Voytech | May 17, 1949 |
| 2,531,079 | Payne | Nov. 21, 1950 |
| 2,836,440 | Brumagim | May 27, 1958 |
| 2,886,349 | Porges | May 12, 1959 |
| 2,895,750 | Gardner et al. | July 21, 1959 |
| 2,902,301 | Daeschner | Sept. 1, 1959 |
| 2,990,202 | Dennison | June 27, 1961 |